Dec. 11, 1962 J. BOYCE 3,067,791
ROTARY PEELING CUTTER
Filed Jan. 8, 1959 2 Sheets-Sheet 1
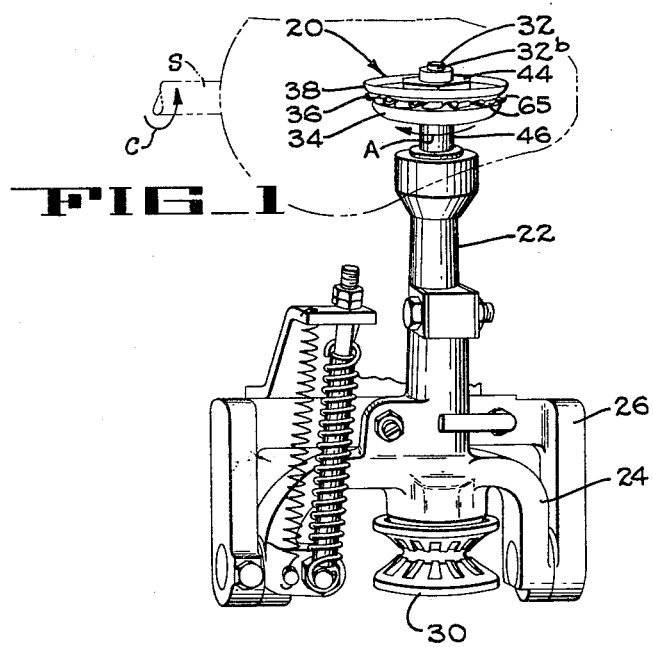
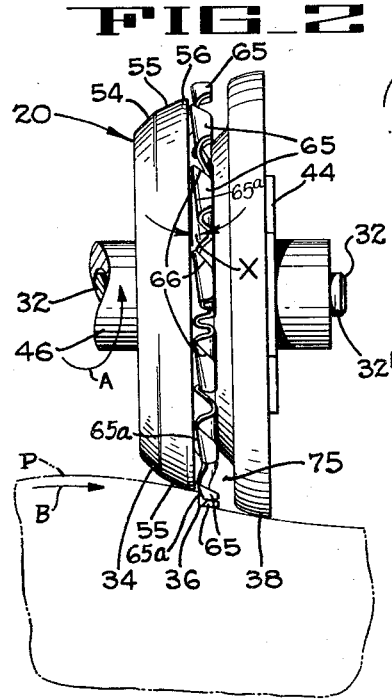
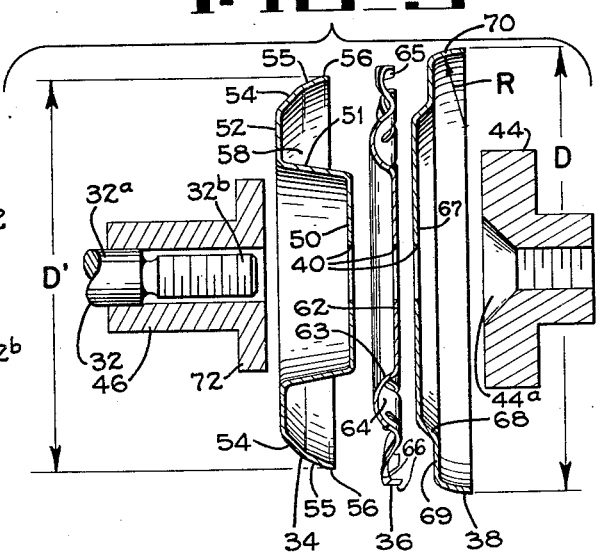
INVENTOR
JOHN BOYCE
BY Hans G. Hoffmeister
ATTORNEY

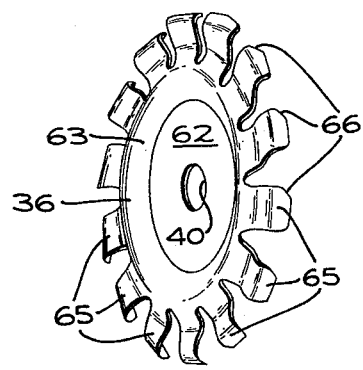
FIG_4
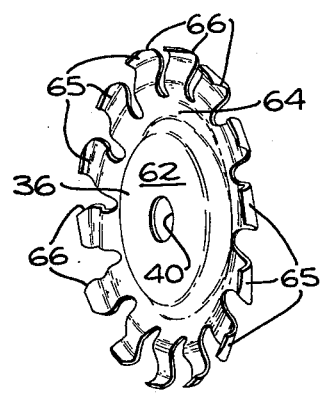
FIG_5

United States Patent Office 3,067,791
Patented Dec. 11, 1962

3,067,791
ROTARY PEELING CUTTER
John Boyce, San Jose, Calif., assignor to FMC Corporation, a corporation of Delaware
Filed Jan. 8, 1959, Ser. No. 785,710
5 Claims. (Cl. 146—43)

This invention pertains to machinery for processing fruit, and more particularly relates to rotary cutters for peeling fruit, such as pears or the like.

The commercial peeling of fruit by means of rotary cutters has not been entirely satisfactory due, in a large measure, to the fact that it is difficult to control the depth of cut of rapidly rotating cutters as they move over the more or less irregular surface of the fruit. Some cutters dig deeply into the fruit at points where the contour of the surface of the fruit changes rapidly, while other cutters skip across such surfaces leaving unpeeled areas.

It is an object of the present invention to provide a rotary cutter assembly particularly adapted to efficiently peel the skin from the surface of fruit.

Another object is to provide a rotary cutter having gauge means adapted to effectively control the depth of the peeling cut.

Another object is to provide improved gauge means for a rotary cutter.

Other and further objects and advantages will become apparent from the following description taken in connection with the accompanying drawings, in which:

FIG. 1 is a perspective of a cutter mounting unit on which the cutter assembly of the present invention is mounted.

FIG. 2 is an enlarged side elevation of the rotary cutter of the present invention.

FIG. 3 is an exploded vertical central section of the cutter of FIG. 2.

FIGS. 4 and 5 are enlarged perspective views of the cutting blade used in the rotary cutter of FIG. 1.

The cutter assembly 20 of the present invention is shown in FIG. 1 mounted on a support tube 22 which has a yoke 24 formed at one end. The yoke 24 is pivotally mounted on a bracket 26 that is arranged to be mounted for reciprocating movement in a fruit processing machine to carry the cutter along the surface of a pear from the butt end to the stem end thereof. A fruit processing machine of this type is disclosed in the application of Creed et al., Serial No. 715,805, filed February 17, 1958, now Patent No. 2,984,274, dated May 16, 1961.

A pulley 30, which is arranged to be driven by a belt (not shown), is secured in driving engagement with a cutter support shaft 32 which is journalled for rotation in the support tube 22. The cutter assembly includes a front gauge 34, a cutting blade 36, and a back gauge 38, each of which is centered on the shaft 32 by means of a central circular opening 40 adapted to snugly receive a smooth shank portion 32a of the shaft 32. The blade and the gauges are locked on the shaft 32 by a nut 44 disposed on a threaded end portion 32b of the shaft 32, with the shank portion 32a of the shaft 32 projecting into a recess 44a formed in the nut. A generally tubular spacer member 46 is disposed between the end of the mounting support tube 22 and the front gauge 34.

The front gauge 34 comprises a central flat body portion 50, a generally frusto-conical portion 51 projecting from the body 50, a radially projecting annulus 52, a pair of adjoining frusto-conical gauge surfaces 54 and 55, and a short generally cylindrical surface 56. An annular trough 58 is provided between the portion 51 and the outer wall of the gauge, and a deep recess is provided radially inwardly of the portion 51. This construction provides a gauge that is rigid and capable of holding its form during the peeling operation.

The cutting blade 36 has a central body portion 62, a curved wall 63 providing an annular trough 64, and a plurality of cutting teeth 65 formed on the periphery of the blade. Each tooth 65 has a sharpened cutting edge 66 that is adapted to peel the skin from the fruit. The annular trough 64 provides rigidity for the cutting blade which is made of carbon steel sheet or strip stock approximately 0.016 inch thick.

A particular feature of the present invention is the positioning of an abutment surface formed by the face 65a (FIG. 2) of each tooth on the leading side of the blade at an angle relative to a plane transverse to the shaft 32. It will be noted in FIG. 2 that, as the cutter is rotated in the direction of arrow A, the periphery of a pear P, shown partially in phantom lines, is moved in the general direction of arrow B on the rotary support member S (FIG. 1) which rotates in the direction of arrow C. Accordingly, the peripheral portion of the pear is pressed against the slanted abutment surfaces provided by the faces 65a of the teeth. Since the faces are inclined, the pear is allowed to move into the path of each successive tooth on the cutter. This angle, which is indicated at X in FIG. 2, makes possible a smooth, continuous feeding movement of the fruit into the cutter. In one successful fruit peeling installation, angle X is approximately 10 degrees. It has been found that this angle may be varied to accommodate the cutter for different speeds of rotation of the cutter and different speeds of rotation of the fruit. If the speed of the cutter is increased, or the speed with which the peel is advanced toward the cutter is decreased, the angle may be made smaller.

The back gauge 38 has a central body portion 67, a frusto-conical portion 68, a radially projecting wall portion 69 and an outer curved surface 70 that is formed on a radius, indicated by phantom line R.

When the cutting blade and the gauges are assembled on the shaft 32, the central body portion 62 of the cutting blade abuts the central body portions 50 and 67 of the gauges, and a flange 72 on the spacer member 46 abuts the central portion 50 of the front gauge 34. The unit is so designed that although their central portions are in abutting relation, the teeth 65 of the cutting blade are spaced from the rear gauge 38 to provide an annular opening 75 (FIG. 2) through which peel fragments may be discharged during the peeling operation.

During the peeling operation, the bell-shaped gauges 34 and 38 engage the surface of the fruit and prevent the cutting blade from digging too deeply into the fruit. On the other hand, the gauges are so designed that the cutting teeth are kept in continuous contact with the skin to be peeled so that the entire surface of the fruit is peeled. An arrangement which is particularly effective comprises a cutting blade 36 having an outer diameter of approximately 1.50 inches, a back gauge 38 having an outer diameter D (FIG. 3) of approximately 1.56 inches and a radius R of ¼ inch, and a front gauge 34 in which the outer diameter D' is approximately 1.38 inches, and in which the frusto-conical portion 54 is disposed at an angle of 45 degrees from a plane normal to the axis of the shaft 32, and the frusto-conical portion 55 is disposed at an angle of 65 degrees from said normal plane.

From the foregoing description it will be evident that the present invention provides a compact, rigid cutter assembly that is particularly adapted for efficiently peeling fruit.

It will be understood that modifications and variations may be resorted to without departing from the scope of the novel concepts of the present invention.

Having thus described my invention, what I claim as new and desire to protect by Letters Patent is:

1. A rotary peeling cutter comprising a rotatable shaft, a circular cutting blade centered on said shaft and having a flat central portion, and a pair of gauges disposed on said shaft, one on each side of said blade, said gauges having fruit-contacting surfaces inclined forwardly and inwardly toward the axis of said shaft and having flat central portions abutting the flat central portion of said blade, one of said gauges having an annular trough-shaped rigidifying portion connecting the central portion of said gauge with the fruit-contacting surface of said gauge.

2. A rotary peeler comprising a shaft, a circular cutting blade disposed in centered relation on said shaft, said blade having a flat central body portion, a plurality of teeth projecting from its peripheral portion and an annular wall connecting said central body portion to said teeth and providing an annular trough-shaped blade-rigidifying ridge, a gauge disposed in centered relation on said shaft, said gauge having a flat central body portion in abutting contact with the flat body portion of said blade, a peripheral gauging surface adjacent to but spaced a predetermined distance from the teeth of said blade measured in a direction parallel to said shaft means extending between said gauging surface and the flat central body portion of said gauge and bridging said rigidifying ridge to support said gauging surface in close proximity to the peripheral teeth of said blade, and means for securing said gauge and said blade on said shaft for rotation therewith.

3. A rotary peeling cutter for peeling a fruit having a surface portion as it is advanced in a predetermined direction toward a side face of the cutter comprising a rotatable shaft, a depth gauge operatively associated with said shaft, and a circular cutting blade secured to said shaft for rotation therewith and having a plurality of cutting teeth having cutting edges in a plane transverse to said shaft each tooth having a side surface facing in the opposite direction to said predetermined direction, said surface being inclined rearwardly from the cutting edge of the tooth at an angle relative to said plane to facilitate the advance of the material to be peeled into the tooth next behind.

4. A lightweight rigid pear peeling cutter comprising a rotatable shaft; a circular cutting blade formed from metal material approximately 0.016 inch in thickness, said blade being disposed in centered relation on said shaft and comprising a flat central body portion, a rigidifying ridge encircling said central body portion, and a plurality of teeth projecting from its peripheral portion, each tooth having a curved configuration defining a leading and a trailing edge and providing a convex outer side surface against which fruit is advanced and a concave inner surface, the leading edge of said tooth being sharpened to a cutting edge; and a gauge member disposed on said shaft and including a flat central portion abutting the central portion of said blade, a gauging surface adjacent the outer side surface of said cutter, and a rigidifying trough-shaped member connecting the gauging surface and the central portion of the gauge.

5. A rotary peeling cutter for peeling a fruit having a surface portion advanced in a predetermined direction toward a side face of the cutter, said cutter comprising a rotatable shaft, a depth gauge operatively associated with said shaft, and a circular cutting blade secured to said shaft for rotation therewith and having a plurality of cutting teeth at its periphery, each tooth having a leading cutting edge and a trailing edge disposed rearwardly from said leading edge with respect to the direction of movement of the tooth, the cutting edges of said teeth being disposed in a plane transverse to said shaft, each tooth having an abutment surface facing in the direction opposite said predetermined direction and being arranged to be contacted by the portion of the fruit to be peeled, said abutment surface being disposed at an acute angle relative to said plane and inclined in said predetermined direction and rearwardly from the cutting edge of the tooth toward the trailing edge of the tooth to facilitate the advance of the material to be peeled into the path of the tooth next behind.

References Cited in the file of this patent

UNITED STATES PATENTS

| | | |
|---|---|---|
| 284,823 | Cottrell | Sept. 11, 1883 |
| 742,000 | Brooks | Oct. 20, 1903 |
| 1,626,361 | Schmitt | Apr. 26, 1927 |
| 1,667,502 | Weiss | Apr. 24, 1928 |
| 1,726,722 | Sleeper | Sept. 3, 1929 |
| 1,850,940 | Minor | Mar. 22, 1932 |
| 1,872,732 | Goranson et al. | Aug. 23, 1932 |
| 2,014,067 | Heimers | Sept. 10, 1935 |
| 2,815,571 | Brentani | Dec. 10, 1957 |
| 2,824,367 | McWilliams | Feb. 25, 1958 |